United States Patent
Kim et al.

(10) Patent No.: US 10,588,085 B2
(45) Date of Patent: Mar. 10, 2020

(54) METHOD AND DEVICE FOR PROVIDING A SERVICE FOR A TERMINAL IN A WIRELESS COMMUNICATION SYSTEM

(71) Applicant: Samsung Electronics Co., Ltd., Gyeonggi-do (KR)

(72) Inventors: Sangbum Kim, Gyeonggi-do (KR); Younsun Kim, Gyeonggi-do (KR); Hoyeon Lee, Gyeonggi-do (KR); Donggun Kim, Seoul (KR); Soenghun Kim, Gyeonggi-do (KR); Jaehyuk Jang, Gyeonggi-do (KR); Seungri Jin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 141 days.

(21) Appl. No.: 15/616,605

(22) Filed: Jun. 7, 2017

(65) Prior Publication Data
US 2017/0353928 A1    Dec. 7, 2017

(30) Foreign Application Priority Data

Jun. 7, 2016    (KR) .......................... 10-2016-0070424

(51) Int. Cl.
*H04W 52/02*    (2009.01)
*H04B 1/38*    (2015.01)
(Continued)

(52) U.S. Cl.
CPC .......... *H04W 52/0251* (2013.01); *H04B 1/38* (2013.01); *H04W 52/0219* (2013.01);
(Continued)

(58) Field of Classification Search
None
See application file for complete search history.

(56) References Cited

U.S. PATENT DOCUMENTS 6,370,149 B1 * 4/2002 Gorman ................ H04M 1/723
370/271
8,959,368 B2    2/2015 Lee et al.
(Continued)

FOREIGN PATENT DOCUMENTS

WO    WO 2011/154761    12/2011
WO    WO 2015/197431    12/2015

OTHER PUBLICATIONS

European Search Report dated Oct. 17, 2017 issued in counterpart application No. 17174781.9-1875, 8 pages.

*Primary Examiner* — Alex Skripnikov
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. An apparatus and method are provided for supporting a high data rate service. A method for an application server includes receiving, from a first terminal, a service request for a second terminal; identifying that the second terminal is in a power saving mode; and transmitting an early media service to the first terminal based on information related to the power saving mode of the second terminal.

10 Claims, 13 Drawing Sheets

(51) Int. Cl.
*H04W 64/00* (2009.01)
*H04W 76/28* (2018.01)
*H04L 29/08* (2006.01)

(52) U.S. Cl.
CPC ....... *H04W 52/0229* (2013.01); *H04W 64/00* (2013.01); *H04L 67/125* (2013.01); *H04W 76/28* (2018.02); *Y02D 70/126* (2018.01); *Y02D 70/1242* (2018.01); *Y02D 70/1262* (2018.01); *Y02D 70/164* (2018.01); *Y02D 70/166* (2018.01); *Y02D 70/20* (2018.01); *Y02D 70/21* (2018.01); *Y02D 70/23* (2018.01); *Y02D 70/24* (2018.01); *Y02D 70/26* (2018.01)

(56) References Cited

U.S. PATENT DOCUMENTS

| | | | | |
|---|---|---|---|---|
| 2008/0300969 | A1* | 12/2008 | Zhang | G06Q 30/0241 705/14.73 |
| 2009/0252153 | A1* | 10/2009 | Choi | H04M 3/42017 370/352 |
| 2010/0255810 | A1* | 10/2010 | Itaba | H04W 76/10 455/410 |
| 2012/0184275 | A1* | 7/2012 | Okabe | H04W 76/38 455/435.1 |
| 2016/0262041 | A1 | 9/2016 | Ronneke et al. | |
| 2016/0295504 | A1* | 10/2016 | Wang | H04W 52/02 |

\* cited by examiner

FIG. 3
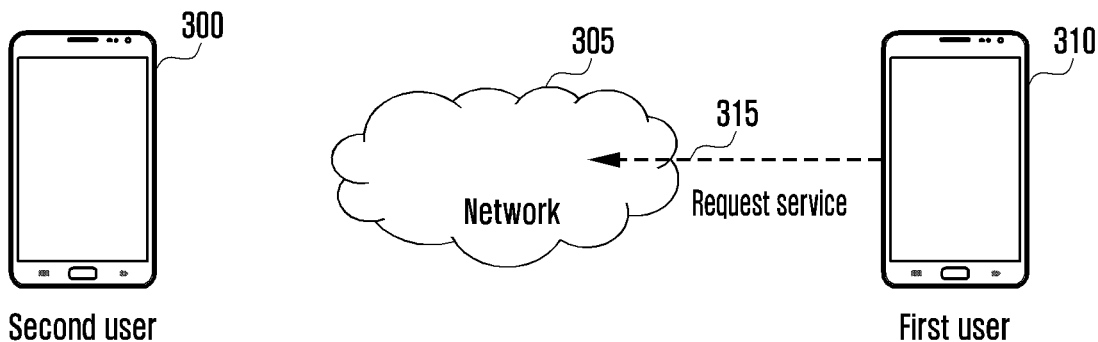
(a) Operation 1
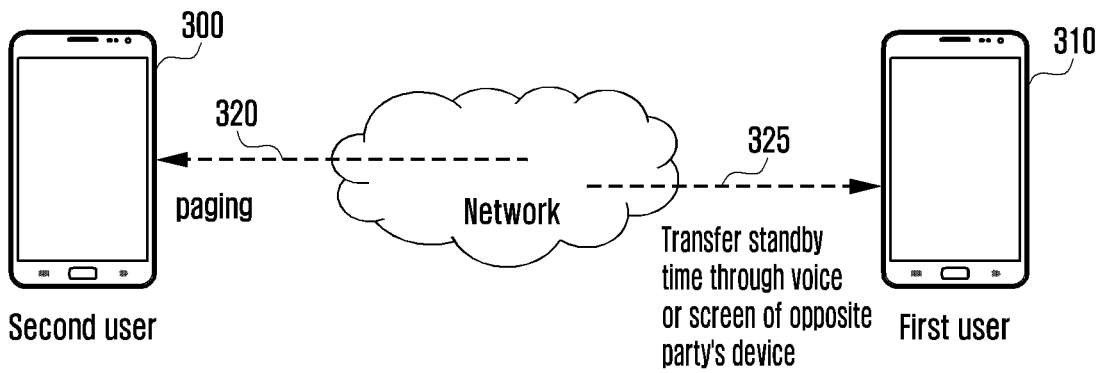
(b) Operation 2
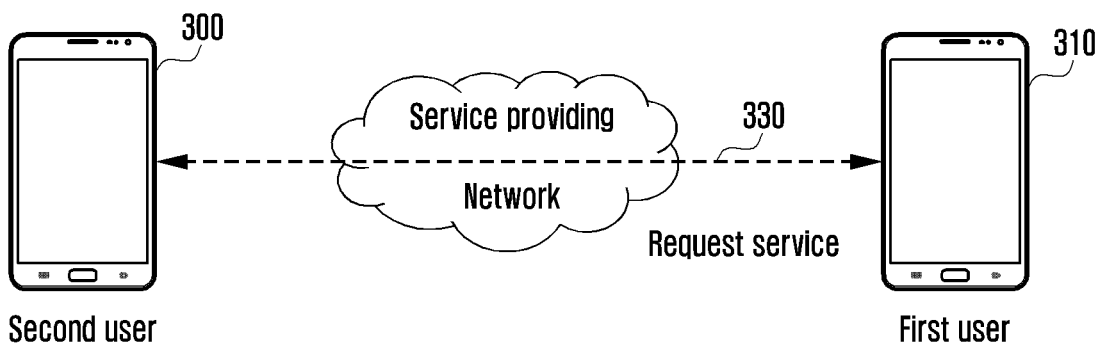
(c) Operation 3

METHOD AND DEVICE FOR PROVIDING A SERVICE FOR A TERMINAL IN A WIRELESS COMMUNICATION SYSTEM

PRIORITY

This application claims priority under 35 U.S.C. § 119 to Korean Application Serial No. 10-2016-0070424, which was filed in the Korean Intellectual Property Office on Jun. 7, 2016, the entire disclosure of which is incorporated herein by reference.

BACKGROUND

1. Field of the Disclosure

The present disclosure relates generally to a wireless communication system, and more particularly, to a method and a device for providing a service for a terminal.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, a mobile communication system has been developed for the purpose of providing communications while securing user's mobility. With the rapid progress of technology, such a mobile communication system can now provide voice communication and also high-speed data communication services. Recently, small-sized wearable devices or IoT devices have appeared to provide even higher-performance functions. In contrast, due to the small size of these small-sized wearable devices or IoT devices, the size of a battery built therein should be smaller than that of an existing mobile communication terminal. Consequently, advanced power saving performance has become an important requirement for such wearable devices or IoT devices.

Further, for utility diversification and user convenience, even the mobile communication terminal still requires improvement of the power saving performance. However, due to the improvement of the power saving performance, a user may be inconvenienced when services to be provided to the user may be delayed. Accordingly, there is a need for a method and apparatus that improve power saving performance without inconveniencing the user.

SUMMARY

The present disclosure has been made in order to solve the above problems, and to provide at least the advantages described below.

An aspect of the present disclosure is to provide a method and an apparatus that improve power saving of a terminal.

Another aspect of the present disclosure is to provide a method and an apparatus for pre-notifying a user that providing of a service that is requested by the user will be delayed if a terminal is to be operated in a power saving mode.

Another aspect of the present disclosure is to provide a method and an apparatus for providing a requested service with respect to one of paired terminals that operates in a power saving mode through the other of the paired terminals.

In accordance with an aspect of the present disclosure, a method is provided for an application server. The method includes receiving, from a first terminal, a service request for a second terminal; identifying that the second terminal is in a power saving mode; and transmitting an early media service to the first terminal based on information related to the power saving mode of the second terminal.

In accordance with another aspect of the present disclosure, a method is provided for a mobility management entity (MME). The method includes detecting that an event has occurred in a second terminal; and transmitting a terminal information change indication message of the second terminal to an application server in response to the event occurring in the second terminal, the terminal information change indication message including information related to a power saving mode. An early media service is transmitted to a first terminal that has requested a service for the second terminal based on the terminal information change indication message including the information related to the power saving mode.

In accordance with another aspect of the present disclosure, an application server is provided, which includes a transceiver; and a controller configured to receive, from a first terminal, via the transceiver, a service request for a second terminal, identify that the second terminal is in a power saving mode, and transmit, via the transceiver, an early media service to the first terminal based on information related to the power saving mode of the second terminal.

In accordance with another aspect of the present disclosure, an MME is provided, which includes a transceiver; and a controller configured to detect that an event has occurred in a second terminal, and transmit, to an application server, via the transceiver, a terminal information change indication message of the second terminal, in response to the event occurring in the second terminal, the terminal information change indication message including information related to a power saving mode. An early media service is transmitted to a first terminal that has requested a service for the second terminal based on the terminal information change indication message including the information related to the power saving mode.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 3 illustrates a process in which a terminal is provided with a service according to an embodiment of the present disclosure;

DETAILED DESCRIPTION

Figure 1:
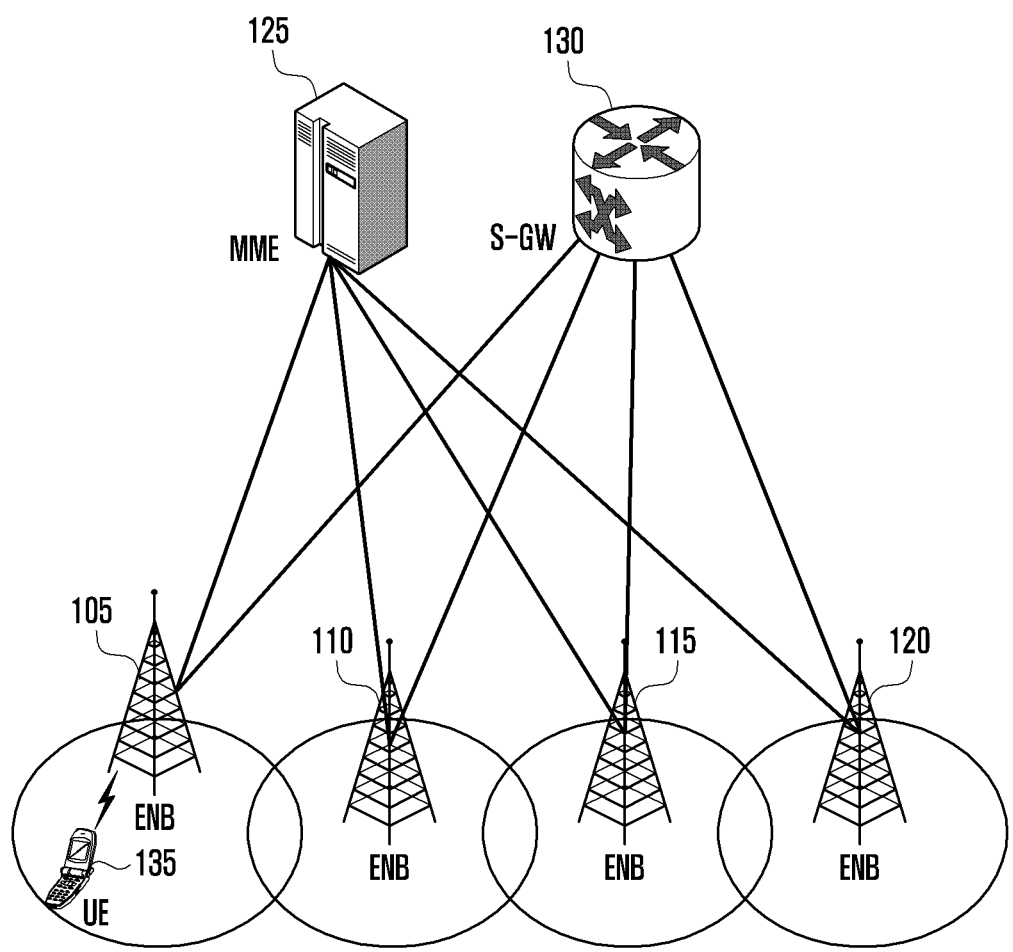
FIG. 1 illustrates an LTE system to which the present disclosure is applied.

Hereinafter, various embodiments of the present disclosure will be described in detail with reference to the accompanying drawings.

In the description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

In the accompanying drawings, sizes and relative sizes of some constituent elements may be exaggerated, omitted, or briefly illustrated. Further, the sizes of the respective constituent elements may not accurately reflect the actual sizes thereof.

In the drawings, the same drawing reference numerals are used for the same or corresponding elements across various figures.

Each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

Herein, the term "~unit", may indicate a software or hardware component, such as a field-programmable gate array (FPGA) or an application-specific integrated circuit (ASIC), which performs certain tasks. However, "~unit" is not limited to software or hardware. The term "~unit" may be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

FIG. 1 illustrates an LTE system to which the present disclosure is applied.

Referring to FIG. 1, a radio access network of an LTE system includes evolved Node Bs (ENBs) (or RAN, Node B, or base station) 105, 110, 115, and 120, an MME (or a core network node) 125, and a serving-gateway (S-GW) 130. A user equipment (UE) (or terminal) 135 is connected to an external network through the ENBs 105 to 120 and the S-GW 130.

In FIG. 1, the ENBs 105 to 120 correspond to existing Node Bs of a universal mobile telecommunications system (UMTS). The ENB 105 is connected to the UE 135 through a radio channel, and performs a more complicated role than the role of the existing Node B. Since all user traffic including a real-time service, such as a Voice over Internet protocol (IP) (VoIP) in the LTE system, are serviced through a shared channel, a device is needed to perform scheduling by gathering of status information, such as a buffer status of the UE 135, an available transmission power status, and a channel status, and the ENBs 105 to 120 take charge of this. That is, the ENBs 105 to 120 may support a connection between the UE 135 and a core network (CN) by gathering status information, such as the buffer status of the UE 135, available transmission power status, and channel status in order to service user traffic. Typically, one ENB controls a plurality of cells.

For example, in order to implement a transmission speed of 100 Mbps, the LTE system uses orthogonal frequency division multiplexing (OFDM) in the bandwidth of 20 MHz as a radio connection technology. Further, the LTE system uses adaptive modulation & coding (AMC) that determines a modulation scheme and a channel coding rate to match the channel status of the UE 135.

The S-GW 130 provides a data bearer, and generates or removes the data bearer in accordance with the control of the MME 125.

The MME 125 is connected to the ENBs 105 to 120 and controls mobility management of the UE 135 and various kinds of control functions. Specifically, to manage the mobility of the UE 135, the ENBs 105 to 120 and the MME 125 may be connected to each other, and the connection between the MME 125 and the ENBs 105 to 120 may be called S1 connection. The MME 125 manages the mobility of the UE 135, and relays the connection between the ENBs 105 to 120 and the S-GW 130. A control signal of the UE 135 is transmitted to the MME 125 through the ENBs 105 to 120. The MME 125 may process the control signal through negotiations with the S-GW 130. A data signal of the UE 135 is transmitted to the S-GW 130 through the ENBs 105 to 120.

Further, the MME 125 and the S-GW 130 may further perform authentication of the UE 135 that is connected to a network and bearer management, and may process a packet that is received from the ENBs 105 to 120 or a packet to be transferred to the ENBs 105 to 120.

Figure 2:
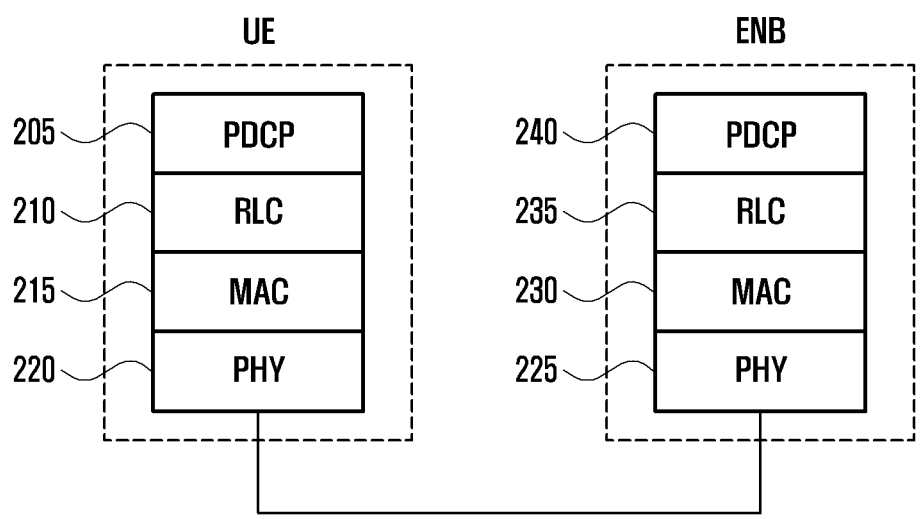
FIG. 2 illustrates a radio protocol structure in an LTE system to which the present disclosure is applied.

FIG. 2 illustrates a radio protocol structure in an LTE system to which the present disclosure is applied.

Referring to FIG. 2, a radio protocol of an LTE system includes a packet data convergence protocol (PDCP) 205 or 240, a radio link control (RLC) 210 or 235, a medium access control (MAC) 215 or 230, and a physical layer (PHY) 220 or 225 in each of the UE and the ENB.

The PDCP 205 or 240 controls IP header compression/decompression operations.

The RLC 210 or 235 reconfigures a PDCP packet data unit (PDU) that is received from the PDCP layer with an appropriate size, and performs an automatic repeat request (ARQ) operation.

The MAC 215 or 230 is connected to various RLC layer devices that are configured in one UE, and performs multiplexing of RLC PDUs to the MAC PDU and demultiplexing of the RLC PDUs from the MAC PDU.

The physical layer 220 or 225 performs channel coding and modulation of upper layer data and produces an OFDM symbol to transmit the OFDM symbol through the radio channel, or performs demodulation and channel decoding of the OFDM symbol that is received through the radio channel to transfer the demodulated and decoded OFDM symbol to an upper layer. Further, the physical layer uses hybrid ARQ (HARQ) for additional error correction, and a receiving end transmits HARQ acknowledge (ACK)/negative acknowledge (NACK) information, i.e., an indication as to whether to receive the packet that is transmitted from a transmitting end with one bit.

Downlink HARQ ACK/NACK information may be transmitted through a physical HARQ indicator channel (PHICH), and uplink HARQ ACK/NACK information may be transmitted through a physical uplink control channel (PUCCH) or physical uplink shared channel (PUSCH).

Although not illustrated in FIG. 2, a radio resource control (RRC) layer may exist in an upper position of the PDCH layer of the UE or the ENB, and may send and receive connection and measurement related setup control messages for the radio resource control.

FIG. 3 illustrates a process in which a terminal is provided with a service according to an embodiment of the present disclosure.

For example, a method for providing a service will be described using a terminal of a second user in a power saving mode, where a first user requests a service intended for the second user. Herein, the user who requests the service is referred to as the first user, whereas the user who is the target of the service request is referred to as the second user. For example, if user A makes a phone call to user B, the user A who requests a voice communication service is referred to as the first user, and the user B who is the target of the phone call made by the user A (i.e., the target of the voice communication service) is referred to as the second user.

Referring to FIG. 3, at operation 1, a first user 310 requests (315) a service from a network 305 with respect to a second user 300. For example, the service requested by the first user 310 may include a voice call service or a video call service with the second user 300.

At operation 2, the network that has received the service request transmits a service request, e.g., paging, (320) to the second user 300. In this case, the terminal of the second user 300 is in a power saving mode, and thus, there may be a delay before the second user 300 receives the service request. Accordingly, the first user 310 may be in a standby state for longer normal. The first user 310 may feel inconvenienced due to the increase of the standby time.

Accordingly, the network may notify (325) the first user 310 of an expected standby time and/or whether the terminal of the second user is in a power saving mode using a media service that is provided before the first user 310 provides the requested service (hereinafter, an "early media service"). For example, the network may notify the first user 310 of the expected standby time and/or whether the terminal of the second user is in the power saving mode using a voice or a screen of an opposite device (a text, a figure, or an image can be displayed on the screen).

At operation 3, after the longer than normal standby time, the service may be established between the two users (330).

As described above, the present disclosure proposes a method for addressing an inconvenience of a first user caused by a second user being in a power save mode by notifying the first user of the expected standby time and/or whether the terminal of the second user is in the power saving mode.

Figure 4:
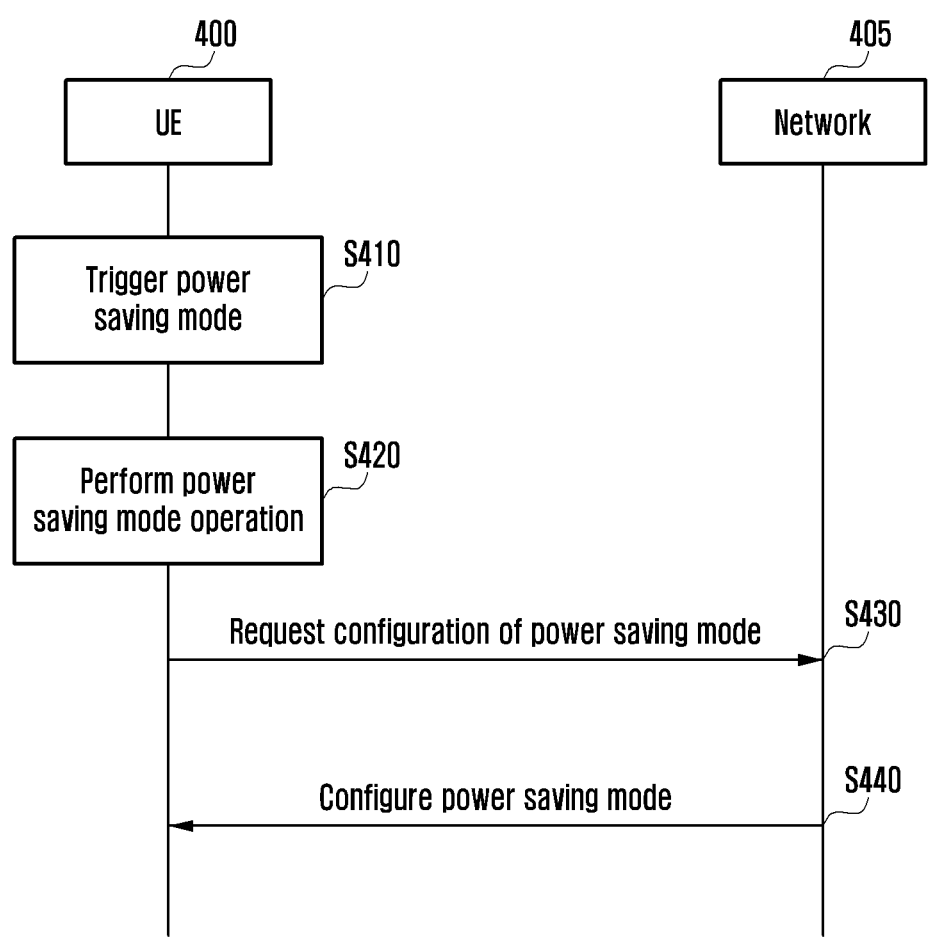
FIG. 4 is a signal flow diagram illustrating a process in which a terminal operates in a power saving mode according to an embodiment of the present disclosure.

FIG. 4 is a signal flow diagram illustrating a process in which a UE operates in a power saving mode according to an embodiment of the present disclosure.

Referring to FIG. 4, at step S410, a UE 400 triggers a power saving mode. The UE 400 may start the power saving mode if a specific condition is satisfied, if a user performs a manual setup, or in accordance with the statistical characteristic of the user. For example, a specific condition may include a residual amount of a battery of the UE 400 being equal to or smaller than a predetermined value, an amount of power consumption for a specific time period being equal to or larger than a predetermined value, and when a pairing between paired UEs is released.

Specifically, if the residual amount of the battery of the UE 400 becomes less than or equal to a predetermined value, or if the amount of power consumption for the specific time period becomes greater than or equal to a predetermined value, the power saving mode may be automatically triggered to reduce the battery consumption. A reference value for triggering the power saving mode may be predetermined, or set by the user.

Further, if the pairing of a user's wearable device and a smart phone is released, the power saving mode of the user's wearable device or the smart phone may be triggered.

Specifically, if the wearable device and the smart phone are paired, the wearable device may receive information from the smart phone. That is, a power of a mobile communication modem (e.g., 3G modem) of the wearable device is turned off, and the smart phone is connected to an LTE network, so that the wearable device may transmit and receive the information. Accordingly, if the pairing between the wearable device and the smart phone is released, the mobile communication modem of the wearable device is shifted to an ON state, and thus, the power saving mode may be triggered.

However, even if the specific condition is satisfied through the user's setup, the power saving mode may not be triggered.

Further, the statistical characteristic of the user may include statistics for a pattern in which the user uses the terminal. Accordingly, the terminal may start the power saving mode based on the statistical characteristic of the user. For example, the terminal may collect the pattern in which the user uses the terminal, and may start the power saving mode in a specific time zone (e.g., business hours or bedtime).

Further, the terminal may start the power saving mode in accordance with the kind of application executed by the user (e.g., when the user uses an alarm application).

However, embodiments of the present disclosure are not limited to the above-described examples, and the terminal may be configured to start the power saving mode using various usage patterns of the user.

Further, the terminal may start the power saving mode in response to the user's manual setup.

At step S420, the terminal performs at least one power saving mode operation to reduce the power consumption. For example, the terminal may display a screen only in black and white, or may configure the screen brightness equal to or lower than a predetermined value. Further, the terminal may limit a partial function thereof, such as power-off of a global positioning system (GPS) module or a near field communication (NFC) modem.

For a mobile communication modem, however, if the power is turned off, the original function of the mobile communication terminal is not performed, and thus, the terminal does not turn off the mobile communication modem. However, instead of turning off the power of the mobile communication modem, the terminal may drive the mobile communication modem in the power saving mode. For example, the power saving technology that is driven by the terminal may include a DRX and a power saving mode (PSM).

At step S430, the UE 400 requests a network 405 to configure the power saving mode. In response to the request, at step S440, the network 405 configures the power saving mode. For example, the network 405 may configure the DRX for the UE 400. Further, the network 405 may configure an eDRX for the UE 400 in order to obtain a power saving effect that is greater than that of the existing DRX operation. The terminal for which the DRX is configured may monitor downlink control information (DCI) in at least one subframe in a configured DRX period, and may turn off a reception circuit in the remaining subframes to reduce the power consumption. The at least one subframe may be configured by a base station. Specifically, the base station may configure the number of subframes through which the DCI is transmitted, and may notify the UE 400 of the configured number of subframes. If a DRX period arrives, the UE 400 may perform monitoring for the configured number of subframes, and may turn off a communication modem and a radio frequency (RF) receiver in the remaining subframes.

Further, the UE 400 for which the eDRX is configured may reduce power consumption in comparison to the UE 400 for which the DRX is configured through turning off the reception circuit (e.g., the communication modem and the RF receiver) for a period that is longer than the period for the DRX.

Although the present disclosure describes that an eDRX is configured for the terminal when the terminal triggers the power saving mode, the present disclosure is not limited thereto. For example, the DRX or the PSM may be configured for the terminal if the terminal triggers the power saving mode.

Figure 5:
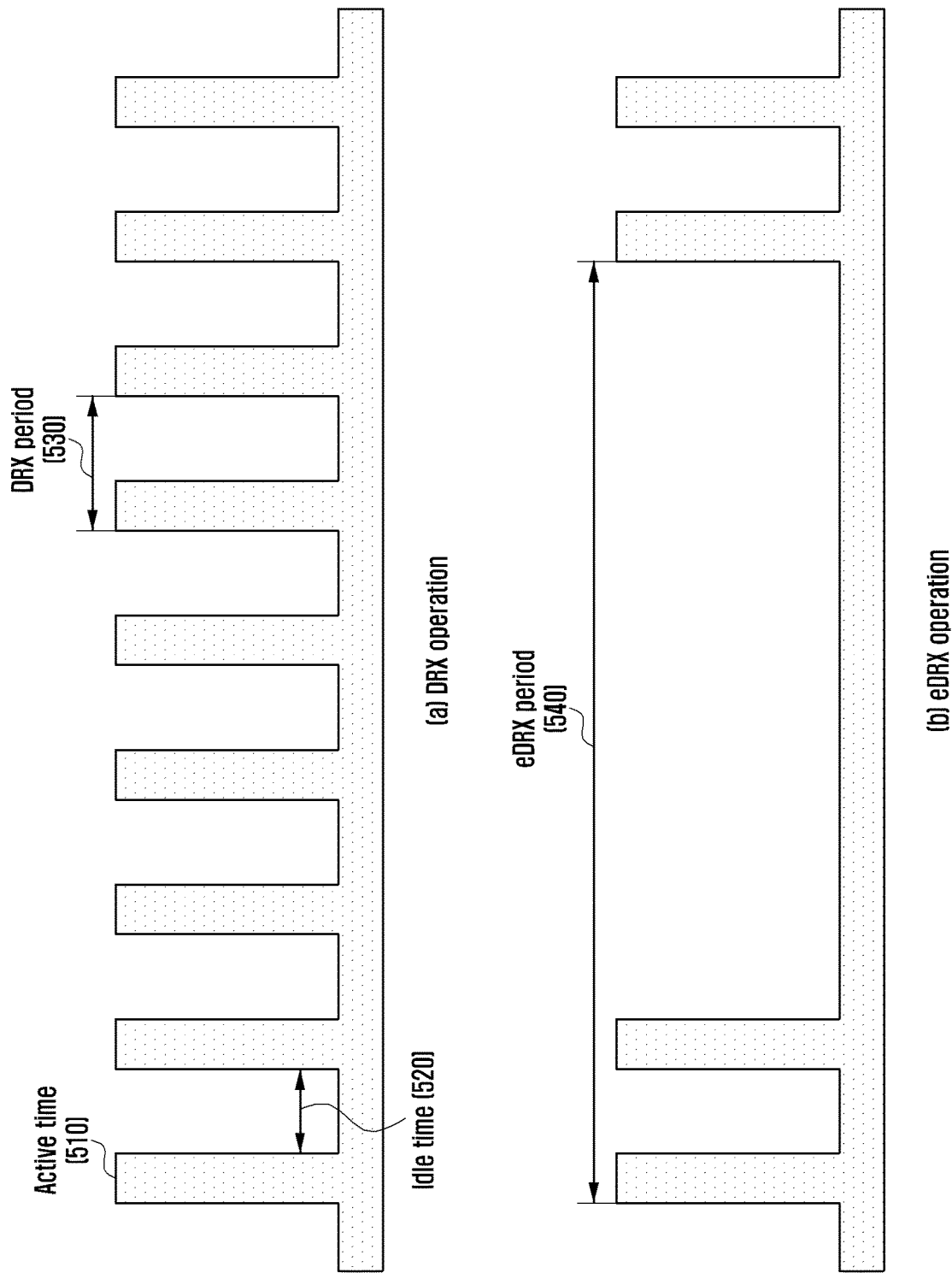
FIG. 5 illustrates a discontinuous reception (DRX) operation and an extended DRX (eDRX) operation according to an embodiment of the present disclosure.

FIG. 5 illustrates a DRX operation and an eDRX operation according to an embodiment of the present disclosure.

Referring to FIG. 5, in the DRX operation, in order to identify a phone call to the terminal itself or existence/nonexistence of a request for a specific service, the terminal should monitor paging from a network. However, if the terminal always performs the paging monitoring, power consumption increases. Therefore, the terminal may monitor the paging in a determined period that is engaged with the network. Such paging monitoring in a determined period as described above is called a DRX operation.

Specifically, the terminal that performs the DRX operation may be awakened only for an active time 510 to receive paging or to measure a cell, and may turn off a mobile communication modem or a Radio Frequency (RF) for other time (idle time) 520. A period in which the active time is repeated may be called a DRX period 530, and the maximum DRX period may be 2.56 seconds.

However, the power saving effect that is caused by the DRX operation may be increased as the DRX period is increased. That is, as the turn-off time of the mobile communication modem or the RF is lengthened, the power saving effect may be increased. Accordingly, an eDRX that corresponds to an extended DRX period has been introduced.

In the eDRX operation, an eDRX period 540 includes a period that is longer than the DRX period 530. For example, in the Rel-13 3G/LTE standards, the maximum eDRX period value 540 is extended to 43.69 minutes in a standby mode, and is extended to 10.24 seconds in a connection mode.

During the power saving mode, the terminal may drive the above-described eDRX technology. However, if the eDRX period is configured extremely long, the power saving effect becomes maximized, but a user may be unable to receive the paging at a proper time. For example, if a first user requests a voice call service that is intended for a second terminal when an eDRX period of a terminal of the second user is configured to 43.69 minutes, the first user may have to wait 43.69 minutes for the second terminal to re-enter the active time. Accordingly, in consideration of a proper standby time, the terminal may configure the eDRX period of 5.12 seconds or 10.24 seconds, which is longer than the existing DRX period (e.g., 2.56 seconds).

Even in this case, the first user who has requested the voice call service may have to wait for a time that is somewhat longer than a typical standby time, and thus, the first user may feel inconvenienced or think that something is wrong with the service. Accordingly, in accordance with an embodiment of the present disclosure, the first party may be notified of an expected standby time to provide a service and/or whether the second terminal is in a power saving mode, if the service is requested with respect to the second terminal for which the eDRX is configured.

Figure 6:
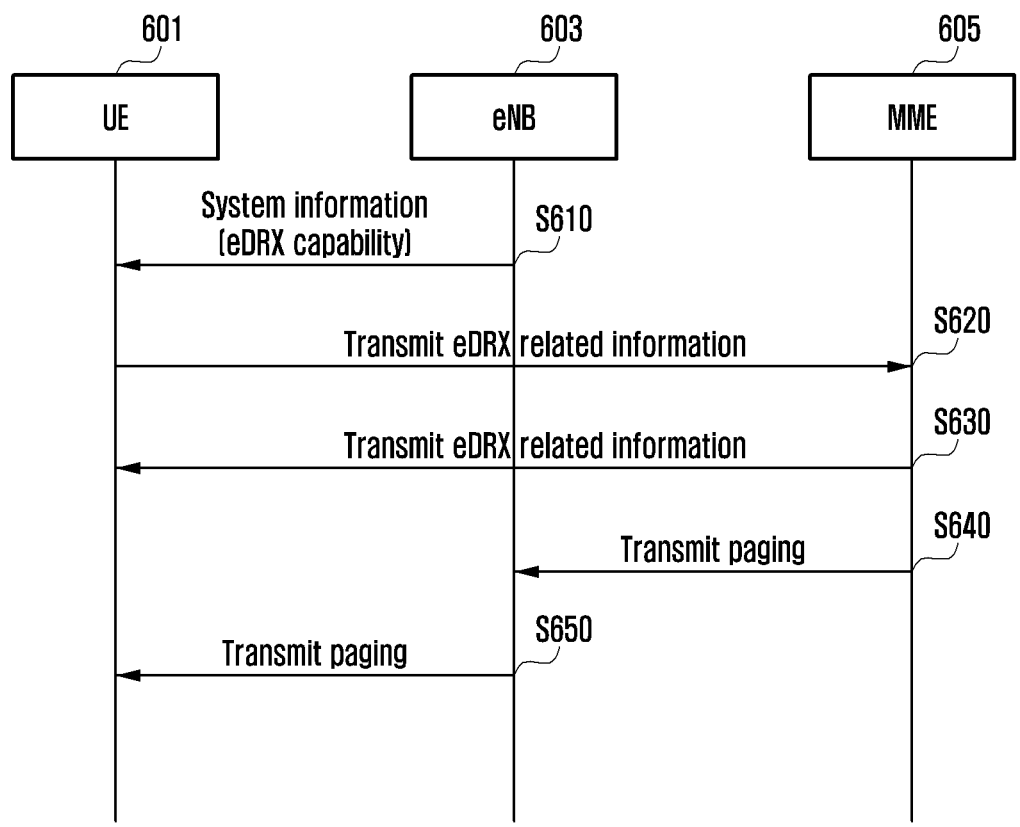
FIG. 6 is a signal flow diagram illustrating a process in which a terminal performs a power saving mode operation according to an embodiment of the present disclosure.

FIG. 6 is a signal flow diagram illustrating a process in which a UE performs a power saving mode operation according to an embodiment of the present disclosure.

Referring to FIG. 6, at step 610, an eNB 603 transmits system information to a UE 601. The eNB 603 may notify the UE 601 whether the eNB 603 supports a power saving mode (e.g., eDRX) using the system information. For example, the eNB 603 may notify the UE 601 whether to support the eDRX (of eDRX capability) using system information bit (SIB) 1.

The UE 601 that has received the system information may identify whether the base station supports the power saving mode through the system information.

At step S620, the UE 601 transmits information related to the power saving mode (e.g., eDRX related information) to an MME 605 through the eNB 603. The information related to the power saving mode may be included in a non-access stratum (NAS) message that is transmitted by the UE 601. The information related to the power saving mode may be used with the eDRX related information or an eDRX parameter.

The eDRX related information may include eDRX period information, and the eDRX period information may be selected by the UE 601. For example, the UE 601 may select the eDRX period information based on the residual amount of a battery. Specifically, if the residual amount of the battery is greater than or equal to a predetermined value, the UE 601 may configure the eDRX period information to 5.12 seconds, whereas if the residual amount of the battery is less than the predetermined value, the UE 601 may configure the eDRX period information to 10.24 seconds. Further, the eDRX period information may be determined based on a user's setup.

Further, the eDRX related information may include at least one piece of eDRX period information.

The UE 601 may transfer the configured eDRX related information to the MME 605 through an ATTACH or TAU process, e.g., through an ATTACH request message or a TAU request message.

If the eDRX period information that is included in the eDRX related information is permitted, at step S630, the MME 605 transmits the eDRX related information that includes the eDRX period information to the UE 601, e.g., using an ATTACH response message or a TAU response message.

If the eDRX period information is not included in the ATTACH or TAU response message, the UE 601 may not perform the eDRX operation. Further, if the eDRX period information that is received from the MME 605 is different from period information that is transmitted by the UE 601, the UE 601 may perform the eDRX operation using the received eDRX period information.

Further, the UE 601 that has received the eDRX related information from the MME 605 may perform paging monitoring using the received eDRX period information.

At step S640, the MME 605 includes the eDRX related information in paging to transfer the paging to the eNB 603.

Accordingly, the eNB 603 may identify the eDRX related information that is included in a paging message.

At step S650, the base station transmits the paging to the UE 601 through application of the eDRX period information to the paging. In the eDRX driving process, the MME 605 may be aware of whether a specific terminal is driving the eDRX, and may store the eDRX period information that is applied to the UE 601 that is driving the eDRX.

Figure 7:
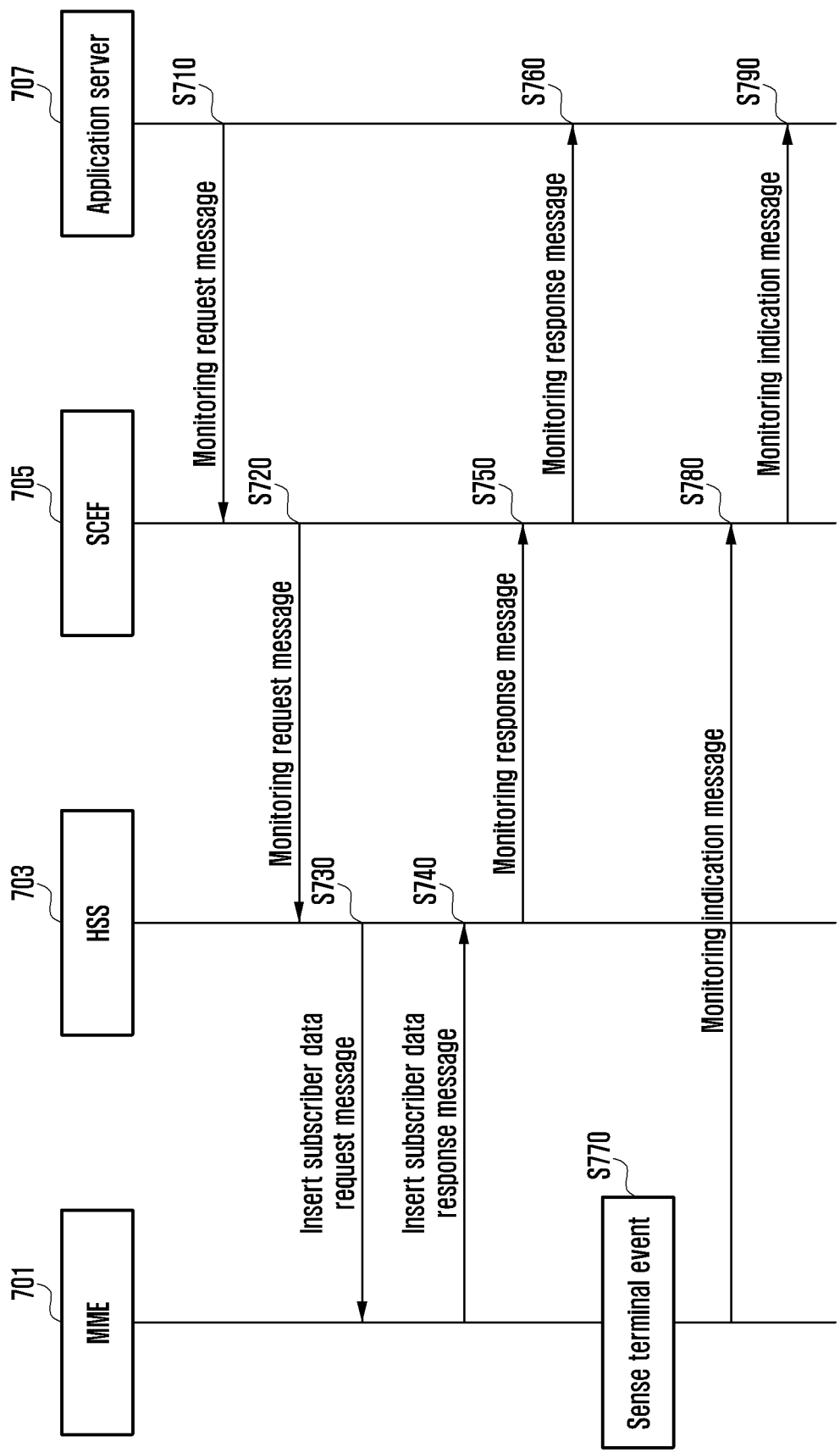
FIG. 7 is a signal flow diagram illustrating a process in which an application server receives information related to a power saving mode according to an embodiment of the present disclosure.

FIG. 7 is a signal flow diagram illustrating a process in which an application server receives information related to a power saving mode according to an embodiment of the present disclosure.

Referring to FIG. 7, an MME 701 may provide information related to a power saving mode (e.g., eDRX related information) for a specific terminal to a network device or an application server (AS) that participates in providing an early media service (i.e., that provides an expected standby time and/or whether a user is in a power saving mode). In FIG. 7, for convenience in explanation, voice over LTE (VoLTE) will be described as an example. However, the participating intra-network device or server may be changed in accordance with the service that is provided to the terminal.

As described above, an MME 701 may receive and store eDRX related information for a specific terminal.

A home subscriber server (HSS) 703 may store subscriber setup information.

A service capability exposure function (SCEF) 705 is one LTE network device (server) that acts as a barrier of an LTE network, and connects an application server 707 and the LTE network to each other. The application server 707 may connect to the LTE network through the SCEF 705. The application server 707 may be changed in accordance with the service that is provided to the terminal. For example, if the terminal requests a VoLTE service, the application server 707 may become a telecommunication application server (TAS) AS that is a core network device that controls a VoLTE service.

At step S710, the application server 707 transmits, to the SCEF 705, a request message for requesting eDRX related information for each terminal. For example, the application server 707 may request the eDRX related information from the SCEF 705 using a monitoring request message that is transmitted to the SCEF 705.

The SCEF 705 that has received the request for the eDRX related information may approve or reject the monitoring request of the application server 707 in accordance with the policy of a network service provider. The SCEF 705 may perform a setup for related other network devices (servers), and may collect information in accordance with the request of the application server 707. Further, if an event occurs in the terminal, the SCEF 705 may be configured to transfer such an event. This may be referred to as an event configuration procedure, which will be described through operations S720 to S750.

At step S720, the SCEF 705 may transmit a monitoring request message to the HSS 703.

At step S730, the HSS 703 that has received the monitoring request message may transmit the monitoring request message or an insert subscriber data request message to the MME 701. The MME 701 stores the eDRX related information, and thus, may be included in the event configuration procedure.

The MME 701 that has received the insert subscriber data request message may transmit a response message (e.g., monitoring response message or an insert subscriber data response message) that includes the eDRX related information to the HSS 703.

The response message that the MME 701 has transmitted to the HSS 703 may include pairing information between terminals, a pairing state indicator, and a forwarding indicator. Further, the information may be included in the eDRX related information.

The user may use the information through pairing between terminals owned by the user, and an identifier of the terminal that can be paired may be referred to as pairing information. Further, information on the terminal that is in a pairing state among the terminals included in the pairing information may be referred to as a pairing state indicator.

The MME 701 may receive the information on the terminal that is currently in the pairing state from the terminal, and may transmit the pairing information and the pairing state indicator to the application server 707.

The application server 707 may identify the terminal of the user that can be paired using the pairing information, and may identify what terminal is in a pairing state through the pairing state indicator.

The pairing state indicator may include information of one bit that is added to the identifier of each terminal that is included in the pairing information, and the application server 707 may identify the paired terminal through the information. Further, the pairing state indicator may be in the form of a bit map.

Accordingly, if any one of terminals that can be paired is in a power saving mode, the application server 707 may forward the service that is provided in accordance with the user's service request to the other paired terminal using the pairing information. Further, if a power of any one of devices that can be paired is turned off, the application server 707 may use the requested service in forwarding the terminal that can be paired using the pairing information.

However, whether to forward the requested service to the paired terminal may be configured by the user. The user may select this during subscription to the mobile communication service, or the terminal may dynamically select this. Accordingly, the application server 707 may identify whether to forward the requested service to the paired terminal through reception of the forwarding indicator.

The MME 701 may receive the forwarding indicator that is determined according to the user's selection from the terminal, and may transmit the received forwarding indicator to the application server 707. The forwarding indicator may include one-bit of information that indicates whether to forward the service in the power saving mode or in the power-off state, two-bits of information for indicating whether to forward the service once at a time, or a bit map. Further, whether to forward the service between paired terminals may be predetermined.

At steps S750 to S760, the HSS 703 that has received the eDRX related information may transmit the response message (e.g., monitoring response message) that includes the eDRX related information to the application server 707 through the SCEF 705.

As described above, the response message that is transmitted from the HSS 703 may include the pairing information, the pairing state indicator, and the forwarding indicator. The pairing information, the pairing state indicator, and the forwarding indicator may be information received from the MME 701, or may be information initially transmitted from the HSS 703.

When the user subscribes to the mobile communication service, information related to the user's terminal may be stored in the HSS 703. Accordingly, the HSS 703 may store identifiers of at least two terminals that are stored for the same user as the pairing information.

Further, the pairing information may be determined in accordance with the type of the terminal. For example, if a wearable terminal has been registered in the HSS 703, there is a high possibility that the wearable terminal is paired with an LTE terminal to be used, and the identifiers of the LTE terminal and the wearable terminal may be stored in the HSS 703 as the pairing information.

During the subscription to the mobile communication service, the HSS 703 may cause the user to determine whether to forward the service or the early media service, and it may store the forwarding indicator therein.

In the above-described manner, the HSS 703 may transmit the pairing information, the pairing state indicator, and the forwarding indicator to the application server 707, even without receiving them from the MME 701.

Accordingly, as described above, the application server 707 may determine whether to forward the service using the information.

Alternatively, the pairing information, the pairing state indicator, and the forwarding indicator may be received from the MME 701 or the HSS 703 in a manner that a part of the information is received from the MME 701, whereas the remaining part of the information is received from the HSS 703. For example, the pairing information and the forwarding indicator may be received from the HSS 703, and the pairing state indicator may be received from the MME 701.

The application server 707 that has received the response message from the HSS 703 may identify the terminal for which the power saving mode (e.g., eDRX) is configured, the eDRX period information of the terminal, the pairing information, the pairing state indicator, and the forwarding indicator.

A process in which the application server 707 identifies the information may be performed before the service request is received (e.g., just after the terminal is connected) or just after the service request is received.

After the event configuration is completed through the above-described process, the MME 701, at step S770, may sense or detect whether an event occurs in the terminal. The terminal event may include an event that occurs in the terminal, such as configuration/release of the eDRX through a specific terminal or a change of predetermined information.

If the terminal event occurs, the MME 701, at step S780, transmits a terminal information change indication message in accordance with the occurrence of the terminal event to the SCEF 703.

At step S790, the SCEF 703 transmits the indication message to the application server 707. The terminal information change indication message may include a monitoring indication message.

The MME 701 may include the changed eDRX related information in the monitoring indication message to be transmitted to the application server 707. For example, if the eDRX is configured in the terminal that operates in a normal mode, the MME 701 may include the eDRX related information that is configured for the terminal in the monitoring indication message.

Further, if a service is requested for the terminal, the application server 707 may identify that the terminal is in a power saving mode based on the pre-received eDRX related information. Further, the application server 707 may calculate a standby time until the requested service is provided based on the eDRX related information. For example, if the user requests a VoLTE service, the application server 707 may calculate an expected standby time until reception of the service succeeds.

Accordingly, the application server 707 may notify the user who has requested the service through the early media of presence/absence of the power saving mode minimize the inconvenience of the user. In addition, the application server 707 may transmit more detailed information, e.g., a standby time for receiving an expected service, to the user who has requested the service through the early media service. For example, if the first user requests the VoLTE service with the second user, where the terminal of the second user is in the power saving mode, the application server 707 may notify the first user of the standby time for receiving the VoLTE service that is provided through a voice service, such as an ARS, before providing the voice call service.

Although the VoLTE service is requested in the example above, the user may request other various services. For example, the user may request a video call. In this case, an application server in charge of the video call, other than the TAS AS, may be used. Accordingly, the application server that is in charge of the video call may notify the user of the standby time to provide the video call using the received eDRX related information. In this case, the application server may notify the user of the standby time using a voice service or a display.

The server may receive the eDRX related information of the terminal through the above-described process just after the terminal is connected to the network. Further, if the service request is received from the terminal, the server may receive the eDRX related information through the above-described process.

Although the method for transmitting or receiving the eDRX related information for a specific terminal and the pairing information through the monitoring request/response message, the event configuration, and the monitoring indication message has been described above, the eDRX related information for the specific terminal and the pairing information may be transmitted using another message that is transmitted or received between the application server and the SCEF. That is, the eDRX related information may be provided to the application server through another standard (e.g., a session initiation protocol (SIP) message), an embodied message, or a specific process.

Figure 8:
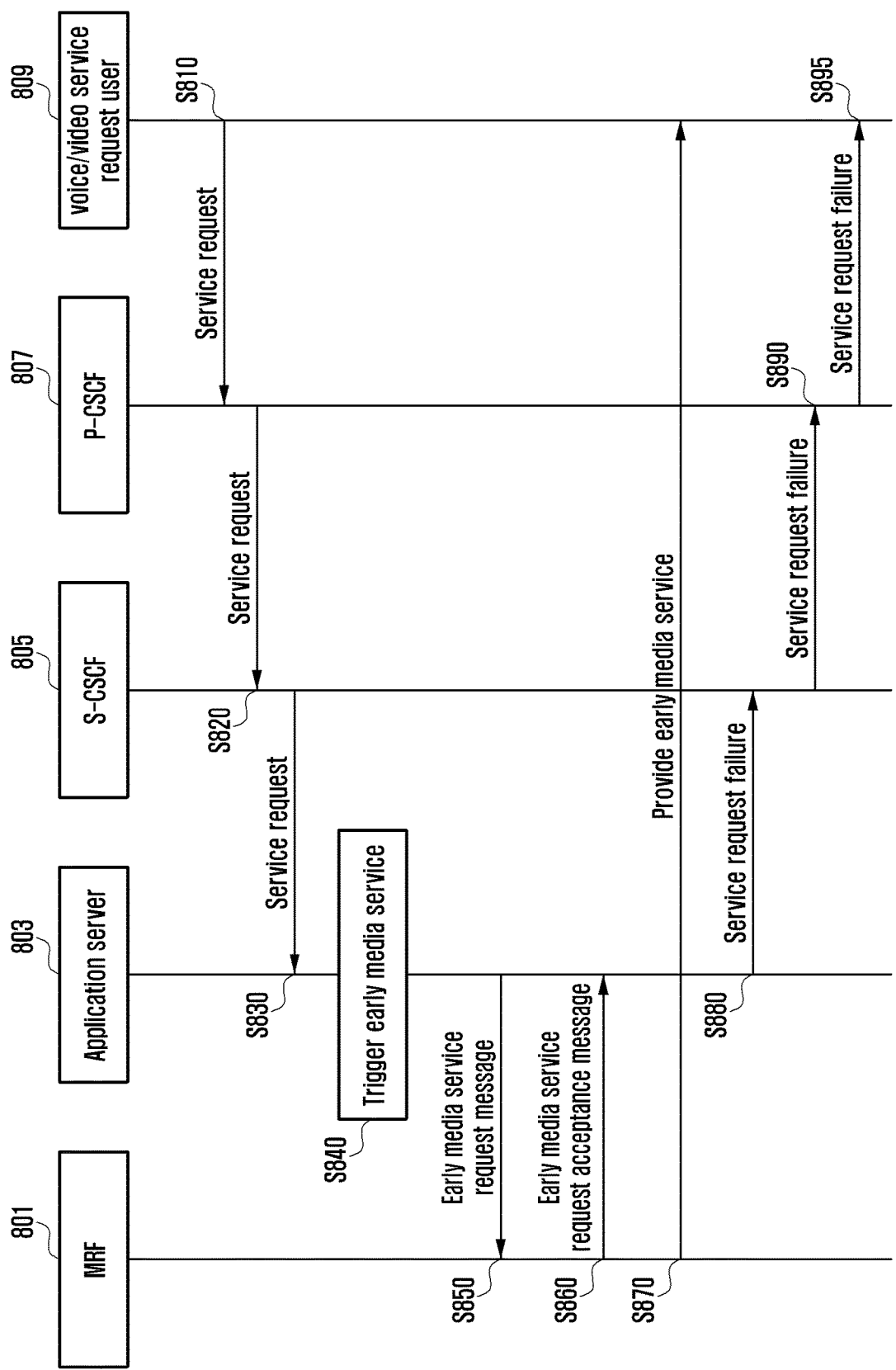
FIG. 8 is a signal flow diagram illustrating a method for providing an early media service to a terminal according to an embodiment of the present disclosure.

FIG. 8 is a signal flow diagram illustrating a method for providing an early media service to a terminal according to an embodiment of the present disclosure.

Referring to FIG. 8, at step S810, a first user 809 may request a service, such as voice/video call for another user (i.e., a second user).

At steps S820 to S830, the service request may be transmitted to a related application server 803 through a proxy call state control function (P-CSCF) 807 that is an IMS object, and a serving call state control function (S-CSCF) 805.

The application server 803 may include a TAS AS for a VoLTE service. The description of FIG. 8 below assumes that the first user 809 who has requested a service and the second user who is a reception user are subscribers of the same network. However, even if the first user 809 and the second user are subscribers of different networks, a similar method may be applied thereto.

The application server 803 that has received the service request may identify whether the terminal of the second user is in the power saving mode using the information that is included in the pre-received monitoring indication message.

If the terminal of the second user is in the power saving mode, the application server 803, at step S840, triggers an early media service. The early media service is provided before the service that is requested by the first user 809 is provided. For example, when the first user 809 requests a voice call with the second user, the early media service may provide a specific ARS voice service to an opposite party who has made a phone call before the voice call configuration is completed.

In this case, the application server 803 may determine whether to trigger the early media service using eDRX related information of the terminal of the second user. Whether to trigger the early media service may be determined in accordance with a predetermined rule. For example, the application server 803 may calculate an expected standby time for providing the service using eDRX period information that is pre-provided from an MME, and may trigger the early media service if the expected standby time is equal to or larger than a specific threshold value.

If it is determined to trigger the early media service, the application server 803 may transmit the early media service to the first user through a media resource function (MRF) 801.

Specifically, at step S850, the application server 803 transmits an early media service request to the MRF 801. At step S860, the MRF 801 transmits a message for accepting the early media service request to the server application 803.

The application server 803 may transmit information on what early media are to be transmitted or information on how long the expected standby time is, and the MRF 801 may provide the early media service to the terminal using the information.

For example, the application server 803 may select the ARS voice service as the early media service. Further, the application server 803 may select a proper ARS voice service announcement. In this case, the application server 803 may provide the ARS voice service that includes not only an announcement of the second user, who is an opposite party call expectant, that the standby time is somewhat long in the power saving mode but also more detailed expected standby time information. In this case, the expected standby time may be derived using the eDRX period information pre-provided from the MME. Further, the application server 803 may transmit the expected minimum standby time to the first user 809 through the early media service.

At step S870, the MRF 801 provides the early media service to the first user 809, based on the information that is received from the application server 803.

Further, the early media service may be provided even through a separate new dedicated device. Even when using the new device, in the same manner as described above, determination on whether to provide the ARS voice service and configuration of the voice service announcement may be applied in the same manner. Further, in addition to the ARS voice service, the early media service may be provided even through a text, a figure, or an image that is displayed on a screen of the user terminal.

Even when the first user 809 requests a video call service, the early media service may be provided through a procedure that is similar to the above-described procedure.

Specifically, if the first user 809 requests the video call service with the second user, a related application server 803 may receive the request. The application server 803 that provides the video call service may be a TAS AS that is the same server as the server that provides the voice call service, or may be a separate dedicated network device or server. The application server 803 may identify whether the terminal of the second user is in the power saving mode using the received eDRX related information. If the terminal of the second user is in the power saving mode, may provide the early media service in consideration of the extent of the standby time up to the video call service start time. In this case, the application server 803 may transfer notification of the long standby time due to the power saving mode of the opposite party or expected standby time information to the first user 809 through an ARS voice, a text, a figure, or an image displayed on the screen Depending on the terminal situation or the network situation, the application server 803 may not provide the service that is requested by the first user 809. In this case, the application server 803, at steps S880 to S895, transmits a service request failure message to the first user 809 through the S-CSCF 805 and the P-CSCF 807.

Figure 9:
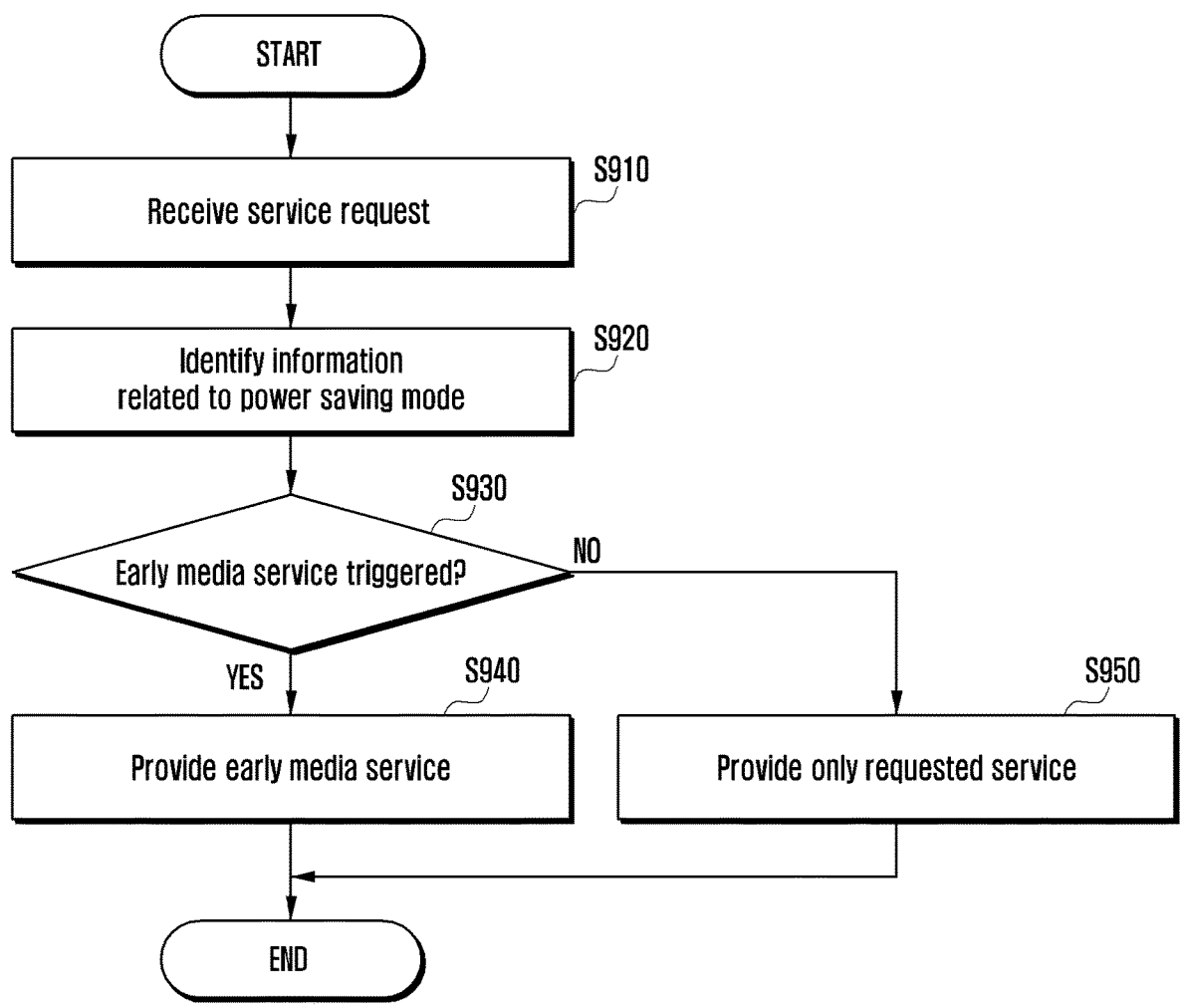
FIG. 9 is a flowchart illustrating an operation of an application server for providing an early media service according to an embodiment of the present disclosure.

FIG. 9 is a flowchart illustrating an operation of an application server for providing an early media service according to an embodiment of the present disclosure.

Referring to FIG. 9, at step S910, an application server receives a service request from a first user requesting a service that is intended for a second terminal. The application server may receive the service request of the first user through a P-CSCF and an S-CSCF that are network entities. The application server may be differently determined in accordance with the kind of the service.

The application server that has received the service request may identify whether a power saving mode (e.g., eDRX) is configured for a terminal. The application server may identify whether the terminal performs an eDRX operation using information that is included in a pre-received monitoring indication message.

If the terminal performs the eDRX operation, the application server, at step S920, identifies information related to the power saving mode (i.e., eDRX related information) of the terminal of the second user. The application server may identify the eDRX related information that is included in the pre-received monitoring indication message.

At step S930, the application server that has identified the eDRX related information of the terminal of the second user determines whether to trigger an early media service using the eDRX related information of the terminal of the second user.

For example, the application server may calculate an expected standby time for providing the service using pre-received eDRX period information, and if the expected standby time exceeds a predetermined threshold value, the application server may trigger the early media service.

At step S940, when the application server that has triggered the early media service, the application server provides the early media service to the terminal of the first user. For example, the application server may provide, to the first user, the early media service including content indicating that the terminal of the second user is in the power saving mode, and thus, the standby time may be somewhat long. Further, the application server may provide the early media service that includes the expected standby time to the first user.

The early media service may be provided through an ARS voice service or a text, a figure, or an image that is displayed on a display of the terminal.

However, if the early media service is not triggered in step S930, the application server does not provide the early media service to the terminal of the first user, but only provides the requested service at step S950.

The user may possess a plurality of terminals that can perform mobile communication, e.g., a smart phone and a wearable device (smart watch) having a mobile communication modem. In this case, more diverse solutions may be considered.

Figure 10:
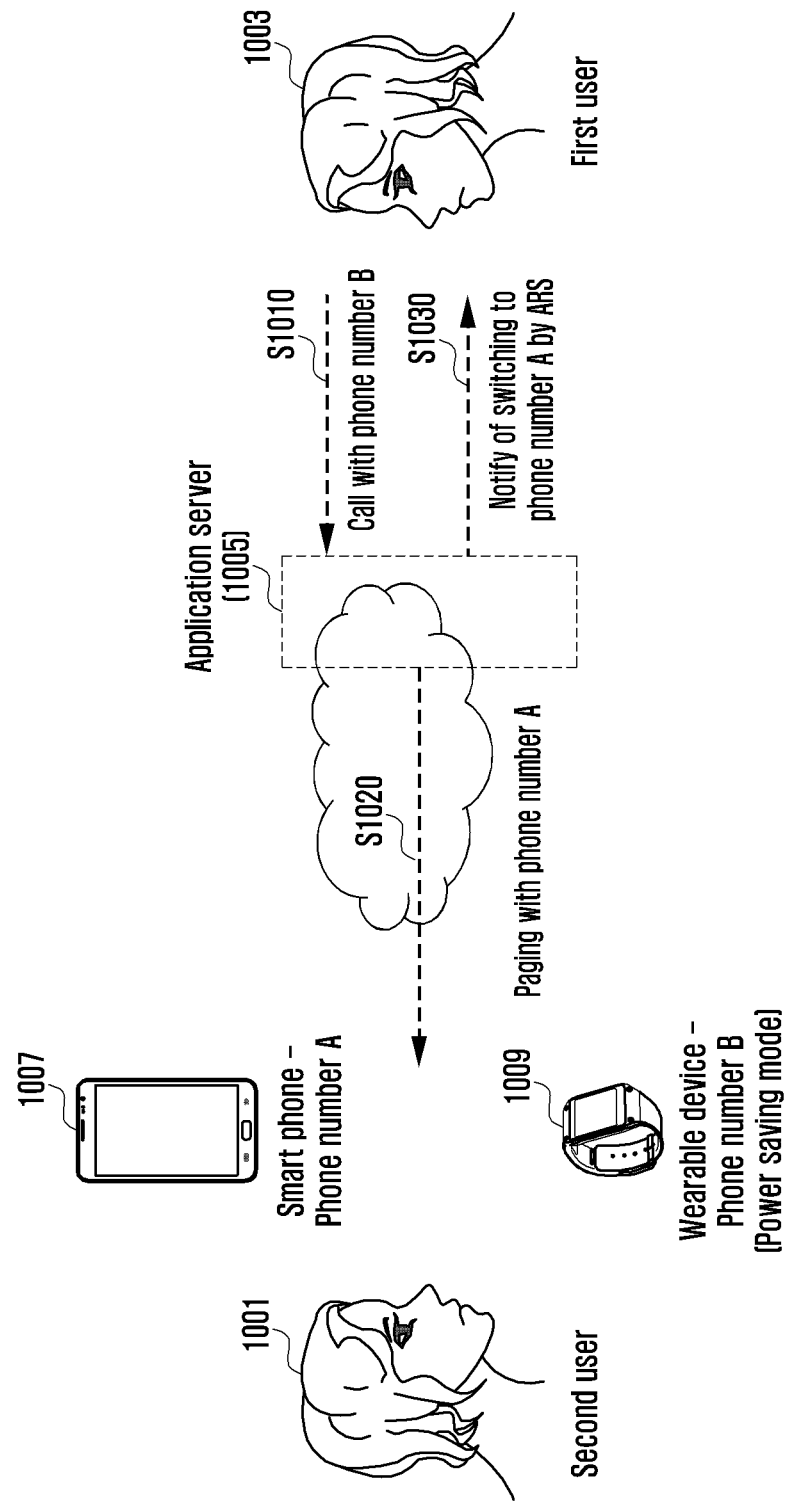
FIG. 10 illustrates a method for providing a mobile communication service to a terminal according to an embodiment of the present disclosure.

FIG. 10 illustrates a method for providing a mobile communication service to a terminal according to an embodiment of the present disclosure.

Referring to FIG. 10, a second user 1001 possesses a smart phone 1010 having a mobile communication modem and a wearable device 1020, which have their own phone numbers A and B. If the second user has the two terminals, it is not necessary for all the terminals to show the best performance. That is, through mutual supplementation, power consumption may be saved. Two terminals that are within a short distance of each other may be coupled (or paired) to each other, and one of the two terminals may be in the power saving mode to reduce the power consumption. For example, the wearable device 1009 may be in the power saving mode.

If one terminal is in the power saving mode, eDRX related information of the terminal that operates in the power saving mode may be reported to an application server 1005 through a monitoring indication message.

Further, information that the wearable device 1009 is paired with the smart phone 1007 may also be provided to the application server 1005. The application server 1005 may receive and store pairing information from an MME or an HSS. For example, an identifier of the smart phone 1007 and the wearable device 1009 may be included in the pairing information. Further, the application server 1005 may receive a pairing state indicator that indicates whether a device that is included in the pairing information is in a pairing state from the MME or the HSS. The pairing state indicator may include one-bit of information or may be in the form of a bit map.

Detailed contents are the same as those described above, and thus the explanation thereof will be omitted.

In FIG. 10, it is assumed that the application server 1005 receives information that the wearable device 1009 and the smart phone 1007 of the second user 1001 are paired and information that the wearable device 1009 of the second user 1001 is in the power saving mode.

At step S1010, a first user 1003 may request a service that is intended for the wearable device 1009 that is in the power saving mode. For example, the first user 1003 makes a phone call to the wearable device 1009 using number B.

The application server 1005 that has received the service request may identify the smart phone 1007 that is paired with the wearable device 1009 using the pairing information and the pairing state indicator that are received from the MME and the HSS.

If the smart phone 1007 that is paired with the wearable device 1009 is identified, the application server 1005, at step S1020, transmits a paging signal to the smart phone 1007 that is paired with the wearable device 1009, but not the wearable device 1009 that is in the power saving mode. That is, the application server 1005 may transmit the paging signal to the smart phone 1007 that is paired with the wearable device 1009, instead of the wearable device 1009 that is actually called but is in the power saving mode. Consequently, a user can be provided with a smooth service.

After transmitting the paging signal to the smart phone 1007 that is paired with the wearable device 1009 that is in the power saving mode, the application server 1005, at step S1030, provides, to the first user 1003, an early media service including content indicating that the wearable device 1003 is in the power saving mode and that the phone call is switched to the smart phone 1007 that is paired with the wearable device 1009. Through this, users can make phone calls within a typical standby time.

However, whether to switch the paging during the service request intended for the terminal that is in the power saving mode may be changed in accordance with a user's setup. The user may determine this during subscription to a mobile communication service, and may change the setup through the terminal. The application server 1005 may receive information on whether to switch the paging through a forwarding indicator. If information that the paging is not switched is transmitted through the forwarding indicator, the application server 1005, at step S1020, may transmit the paging signal to the wearable device 1009.

The above process may be applied even when a power of any one device is turned off. As described above, the application server 1005 may receive the pairing information from the MME or the HSS, and may receive information that the power of any one device is turned off. Accordingly, if a service that is intended for the terminal of which the power is turned off is requested, the application server 1005 may provide the service through switching of the paging to the terminal that can be paired with the device. As described above, whether to switch the paging may be configured by the user during user's subscription to the mobile communication service, or it may be configured through the terminal. In this case, the application server 1005 may be notified of this through the forwarding indicator. Accordingly, if the user configures that the paging switching is not possible, the service may not be provided.

Figure 11:
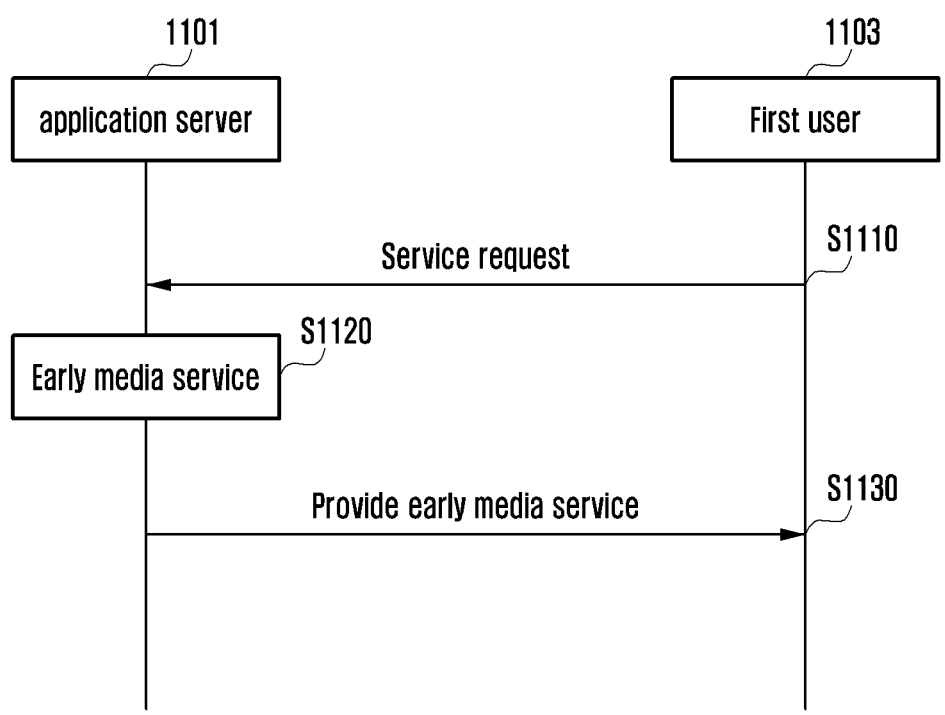
FIG. 11 is a signal flow diagram illustrating a method for providing a mobile communication service to a terminal according to an embodiment of the present disclosure.

FIG. 11 is a signal flow diagram illustrating a method for providing a mobile communication service to a terminal according to an embodiment of the present disclosure.

Referring to FIG. 11, at step S1110, a first user 1103 requests a service intended for a second user. The service request may be transferred to a related application server 1101, e.g., a TAS AS.

The application server 1101 may identify whether a terminal of the second user is paired through pairing information and a pairing state indicator that are included in a monitoring indication message before or after receiving the service request.

Accordingly, the application server 1101 that has received the service request may utilize an early media service with respect to the paired terminal. Specifically, the application server 1101 may determine whether to trigger the early media service using eDRX related information, and at step S1120, triggers the early media service.

Whether to trigger the early media service may be determined in accordance with a predetermined rule. For example, if the terminal device of the second user that is the subject of the service request is in the power saving mode and is paired with another terminal device, the application server may trigger the early media service after transmitting the paging to the other terminal device.

Further, if the service is requested for the terminal that is in the power saving mode in which an expected standby time for receiving the provided service is greater than or equal to a predetermined threshold value, the early media service may be triggered. Accordingly, if the expected standby time is less than the threshold value, the early media service is not triggered, but the service may be provided for the terminal that is in the power saving mode.

As described above, information for determining whether to trigger the early media service may be provided from the MME. The detailed contents are the same as those described above, and thus the explanation thereof will be omitted.

In FIG. 11, the early media service is triggered when the terminal of the second user that is the subject of the service request is in the power saving mode, and is paired with another terminal device.

If the early media service is triggered, the application server 1101, at step S1130, transmits the paging to the other paired terminal and transmits, to the first user 1103, an announcement that a phone call is switched to the paired terminal device through an ARS voice service.

Further, the application server may provide the service even through a separate new dedicated device. Even using the new device, in the same manner as described above, a determination as to whether to provide the ARS voice service and configuration of the voice service announcement may be applied in the same manner.

In addition to the ARS voice service, the early media service may be provided even through a text, a figure, or an image that is displayed on a screen of the user terminal. As another example, a voice call and a video call may provide the early media service through the same procedure.

Figure 12:
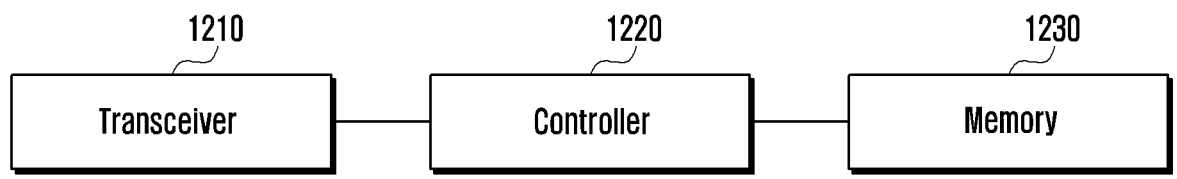
FIG. 12 illustrates an application server according to an embodiment of the present disclosure.

FIG. 12 illustrates an application server according to an embodiment the present disclosure.

Referring to FIG. 12, an application server includes a transceiver 1210, a controller 1220, and a memory (or a storage unit) 1230.

The transceiver 1210 may transmit and receive signals with another network entity. The transceiver 1210 may transmit a monitoring request message to an SCEF, and may receive a monitoring response message in response to the request message. Further, if an event occurs in a terminal, the transceiver 1210 may receive a corresponding monitoring indication message.

The controller 1220 may control the operation of the application server according to the present disclosure.

Specifically, the controller 1220 may operate to transmit a request message for receiving information related to a power saving mode of the terminal to an MME through the SCEF. Further, the controller 1220 may operate to receive a response message to the request message from the MME through the SCEF. The controller 1220 may identify eDRX period information using eDRX related information that is included in the response message. Further, the controller 1220 may identify information, such as pairing information, a pairing state indicator, and a forwarding indicator, which are included in the response message.

Further, if an event occurs in the terminal, the controller 1220 may receive a terminal information change indication message (e.g., a monitoring indication message) from the MME through the SCEF. The controller 1220 may identify changed eDRX related information of the terminal that is included in the monitoring indication message. For example, if the terminal is switched from a normal mode to a power saving mode, the monitoring indication message may include eDRX related information that is newly configured for the terminal, and the controller 1220 may identify the eDRX related information that is newly configured for the terminal.

Further, the controller 1220 may receive from a first terminal a service request message in accordance with a service request intended for a second user. The controller 1220 may identify whether the terminal of the second user is in the power saving mode. If the terminal of the second user is in the power saving mode, the controller 1220 may determine whether to provide an early media service in accordance with the service request. Whether to provide the early media service may be determined in accordance with a predetermined method. For example, the controller 1220 may calculate an expected standby time for providing the service using eDRX period information that is pre-provided from the MME, and may provide the early media service, if the expected standby time is greater than or equal to a threshold value. Further, if the terminal that is the subject of the service request is in the power saving mode and the terminal is paired with another terminal, the controller 1220 may provide the early media service. Further, if the terminal that is the subject of the service request is in a turn-off state, the controller 1220 may provide the early media service.

If it is determined to provide the early media service, the controller 1220 may transmit the early media service to the terminal of the first user. The controller 1220 may transmit, to the first user, information including content indicating that the terminal of the second user is in the power saving mode and the standby time is somewhat long. Further, the controller 1220 may calculate the expected standby time using the received eDRX period information, and may transmit the expected standby time to the first user through the early media. The early media service may include an ARS voice service, a text, a figure, or an image on the screen.

However, if a terminal A that is the subject of the service request is in the power saving mode and is paired with a terminal B, the controller 1220 may transmit paging for the terminal A to the terminal B, and may transmit the early media service to the terminal B. In this case, the controller 1220 may identify that the terminal A and the terminal B are in a paired state through the pairing state indicator that is included in the monitoring indication message that is received from the MME through the SCEF. Further, the controller 1220 may transmit, to the terminal B, the early media service that includes information that indicates the paging for the terminal A. For example, the controller 1220 may transmit an announcement that a phone call is switched to the paired terminal device through an ARS voice service.

If the forwarding indicator indicates that the paging forwarding is not permitted, the paging switching procedure may not be performed.

If the terminal A is in a turn-off state, the controller 1220 may transmit the paging to the terminal B that can be paired with the terminal A, and may transmit the early media service to the terminal B. The controller 1220 may identify that the terminal A and the terminal B are devices that can be paired with each other through the pairing information that is received from the MME through the SCEF. After the paging switching, the controller 1220 may transmit the early media service that includes the information that indicates the paging for the terminal A to the terminal B. For example, the controller 1220 may transmit an announcement that the terminal A is in a power-off state and the phone call is switched to the terminal B through the ARS voice service.

If the forwarding indicator indicates that the paging forwarding is not permitted, the paging switching procedure may not be performed.

Further, the controller 1220 may transmit a paging message according to the service request of the first user to the MME, and the MME may transmit the paging message to a base station. The paging message may include the eDRX period information. Accordingly, the base station may transmit the paging message for providing the service to the terminal of the second user in accordance with the eDRX period information. The controller 1220 may transmit the paging message to the terminal of the second user through the MME and the base station before or after providing the early media service to the terminal of the first user.

The memory 1230 may store information that is transmitted and received in accordance with the operation according to the present disclosure. The memory 1230 may store therein the eDRX related information, the paging information, and the forwarding indicator, which are received from the MME. Further, the controller 1230 may store the eDRX related information that is transmitted through the monitoring indication message.

Figure 13:
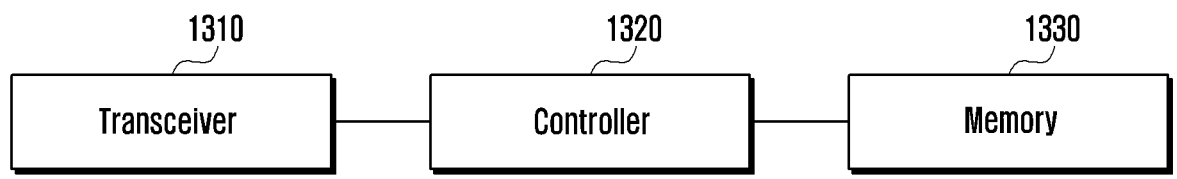
FIG. 13 illustrates an MME according to an embodiment of the present disclosure.

FIG. 13 illustrates an MME according to an embodiment the present disclosure.

Referring to FIG. 13, an MME includes a transceiver 1310, a controller 1320, and a memory (or storage unit) 1330.

The transceiver 1310 may transmit and receive signals with another network entity. The transceiver 1310 may receive a monitoring request message from an application server, and may transmit a monitoring response message that includes eDRX related information of a terminal, paging information, and a forwarding indicator. The transceiver 1310 may transmit, to the application server, a monitoring indication message in accordance with a terminal event occurrence.

The controller 1320 may control the overall operation of the MME according to the present disclosure. The controller 1320 may operate to receive the eDRX related information from the terminal, to transmit the eDRX related information to the terminal, and to configure eDRX for the terminal.

Further, the controller 1320 may operate to receive the monitoring request message from the application server and to transmit the monitoring response message that includes the eDRX related information of the terminal, the paging information, the paging state indicator, and the forwarding indicator. Further, the controller 1320 may operate to monitor whether an event occurs in the terminal, and if the event occurs in the terminal, the controller 1320 may operate to transmit the monitoring indication message that includes changed eDRX related information to the application server.

The eDRX related information that is included in the monitoring indication message may be used for the application server to transmit the early media service.

Further, the controller 1320 may receive the paging from the application server to transmit the received paging to the base station, and when transmitting a paging message to the base station, the controller 1320 may include the eDRX related information in the paging message to be transmitted to the base station.

The memory 1330 may store therein the eDRX related information that is received from the terminal.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method for an application server, the method comprising:
    receiving, from a mobility management entity (MME), information related to a power saving mode of a terminal;
    receiving, from a first terminal, a service request for a second terminal;
    identifying that the second terminal is in a power saving mode using the information received from the MME; and
    transmitting an early media service to the first terminal based on information related to the power saving mode of the second terminal, the early media service being used to notify a user that the service is delayed.

2. The method of claim 1, wherein transmitting the early media service comprises:
    determining that period information included in the information related to the power saving mode is greater than or equal to a predetermined value; and
    triggering the transmitting of the early media service based on a result of the determining.

3. The method of claim 1, wherein identifying that the second terminal is in the power saving mode comprises:
    receiving a terminal information change indication message from the MME in response to an event occurring in the second terminal; and
    identifying the information related to the power saving mode that is included in the terminal information change indication message.

4. The method of claim 1, wherein the early media service comprises at least one of an indication as to whether the second terminal is in the power saving mode or an indication of an expected standby time before the requested service is provided.

5. The method of claim 1, wherein the power saving mode is associated with an extended discontinuous reception (eDRX) mode.

6. An application server, comprising:
    a transceiver; and
    a controller coupled with the transceiver and configured to:
        receive, from a mobility management entity (MME), information related to a power saving mode of a terminal,
        receive, from a first terminal, a service request for a second terminal,
        identify that the second terminal is in a power saving mode using the information received from the MME, and
        transmit an early media service to the first terminal based on information related to the power saving mode of the second terminal, the early media service being used to notify a user that the service is delayed.

7. The application server of claim 6, wherein the controller is further configured to:
    determine that period information included in the information related to the power saving mode is greater than or equal to a predetermined value; and
    trigger the transmitting of the early media service based on a result of the determining.

8. The application server of claim 6, wherein the controller is further configured to:
    receive a terminal information change indication message from the MME in response to an event occurring in the second terminal, and
    identify the information related to the power saving mode that is included in the terminal information change indication message.

9. The application server of claim 6, wherein the early media service at least one of an indication as to whether the second terminal is in the power saving mode or an indication of an expected standby time before the requested service is provided.

10. The application server of claim 6, wherein the power saving mode is associated with an extended discontinuous reception (eDRX) mode.

* * * * *